(12) United States Patent
Ketcham et al.

(10) Patent No.: US 6,673,414 B2
(45) Date of Patent: Jan. 6, 2004

(54) DIESEL PARTICULATE FILTERS

(75) Inventors: Thomas D. Ketcham, Big Flats, NY (US); Dell J. St. Julien, Watkins Glen, NY (US)

(73) Assignee: Corning Incorporated, Corning, NY (US)

(*) Notice: Subject to any disclaimer, the term of this patent is extended or adjusted under 35 U.S.C. 154(b) by 50 days.

(21) Appl. No.: 10/008,697

(22) Filed: Nov. 8, 2001

(65) Prior Publication Data

US 2002/0076523 A1 Jun. 20, 2002

Related U.S. Application Data

(60) Provisional application No. 60/257,340, filed on Dec. 20, 2000.

(51) Int. Cl.[7] .................................................. B32B 3/12
(52) U.S. Cl. ...................... 428/116; 428/34.4; 428/117; 428/188; 55/523; 422/180; 422/222
(58) Field of Search ................................ 428/116, 34.1, 428/34.4, 117, 188; 422/1, 168, 177, 180, 211, 222; 55/523

(56) References Cited

U.S. PATENT DOCUMENTS

| | | | |
|---|---|---|---|
| 3,853,485 A | | 12/1974 | Hogan |
| 4,417,908 A | * | 11/1983 | Pitcher, Jr. |
| 4,420,316 A | | 12/1983 | Frost et al. |
| 4,428,758 A | * | 1/1984 | Montierth |
| 4,448,828 A | | 5/1984 | Mochida et al. |
| 4,667,469 A | * | 5/1987 | Abthoff et al. |
| 4,810,554 A | | 3/1989 | Hattori et al. |
| 5,098,455 A | * | 3/1992 | Doty et al. |
| 5,108,685 A | | 4/1992 | Kragle |
| 5,853,459 A | * | 12/1998 | Kuwamoto et al. |

FOREIGN PATENT DOCUMENTS

| | | |
|---|---|---|
| DE | 199 38 038 | 5/2000 |
| EP | 0 867 223 | 9/1998 |

\* cited by examiner

*Primary Examiner*—Deborah Jones
*Assistant Examiner*—Wendy Boss
(74) *Attorney, Agent, or Firm*—Anca C. Gheorghiu

(57) ABSTRACT

A ceramic filter for trapping and combusting diesel exhaust particulates offering improved configurations that are significantly more resistant to thermal cracking and melting damage comprises a honeycomb filter body composed of porous ceramic material and including a plurality of parallel cell channels traversing the body from a frontal inlet end to an outlet end thereof, a portion of the cell channels are plugged in a non-checkered pattern, and the remaining cell channels are plugged in a checkered pattern. In one embodiment the honeycomb filter body has a section of non-checkered and a section of checkered plugging at the frontal inlet end. In another embodiment the honeycomb filter body has a plurality of cell channels internal plugs. In another embodiment the honeycomb filter body has a plurality of partial cell channels which extend partially from the frontal inlet end into the honeycomb filter body, and are unplugged at the frontal inlet end.

24 Claims, 17 Drawing Sheets

DIESEL PARTICULATE FILTERS

This application claims the benefit of U.S. Provisional No. 60/257,340, filed Dec. 20, 2000, entitled "Diesel Particulate Filters", by Ketcham et al.

BACKGROUND OF THE INVENTION

The present invention relates to filters for the removal of particulate material from diesel engine exhaust streams, and more particularly to a porous ceramic diesel exhaust filter of improved resistance to melting and thermal shock damage under conditions encountered in diesel exhaust systems.

Diesel traps have proven to be extremely efficient at removing carbon soot from the exhaust of diesel engines. The most widely used diesel trap is the wall-flow filter which filters the diesel exhaust by capturing the soot on the porous walls of the filter body. The wall-flow filter is designed to provide for nearly complete filtration of soot without significantly hindering the exhaust flow.

As the layer of soot collects on the surfaces of the inlet channels of the filter, the lower permeability of the soot layer causes a pressure drop across the filter and a gradual rise in the back pressure of the filter against the engine, causing the engine to work harder, thus affecting engine operating efficiency. Eventually, the pressure drop becomes unacceptable and regeneration of the filter becomes necessary. In conventional systems, the regeneration process involves heating the filter to initiate combustion of the carbon soot. Normally, the regeneration is accomplished under controlled conditions of engine management whereby a slow burn is initiated and lasts a number of minutes, during which the temperature in the filter rises from about 400–600° C. to a maximum of about 800–1000° C.

The highest temperatures during regeneration tend to occur near the exit end of the filter due to the cumulative effects of the wave of soot combustion that progresses from the entrance face to the exit face of the filter as the exhaust flow carries the combustion heat down the filter. Under certain circumstances, a so-called "uncontrolled regeneration" can occur when the onset of combustion coincides with, or is immediately followed by, high oxygen content and low flow rates in the exhaust gas (such as engine idling conditions). During an uncontrolled regeneration, the combustion of the soot may produce temperature spikes within the filter which can thermally shock and crack, or even melt, the filter. The most common temperature gradients observed are radial temperature gradients where the temperature of the center of the filter is hotter than the rest of the substrate and axial temperature gradients where the exit end of the filter is hotter than the rest of the substrate.

In addition to capturing the carbon soot, the filter also traps metal oxide "ash" particles that are carried by the exhaust gas. These particles are not combustible and, therefore, are not removed during regeneration. However, if temperatures during uncontrolled regenerations are sufficiently high, the ash may eventually sinter to the filter or even react with the filter resulting in partial melting.

It would be considered an advancement in the art to obtain a filter which offers improved resistance to melting and thermal shock damage so that the filter not only survives the numerous controlled regenerations over its lifetime, but also the much less frequent but more severe uncontrolled regenerations.

SUMMARY OF THE INVENTION

The present invention provides porous particulate exhaust filters offering improved configurations that are significantly more resistant to thermal cracking and melting damage under typical diesel exhaust conditions than current filter designs. At the same time the inventive filters have fewer temperature gradients and fewer hot spots during the regeneration process. For the purposes of this description, hot spots are region the filter which reach temperatures so high that there can develop localized melting and/or cracking of the filter in such regions.

In particular, the invention provides a ceramic filter for trapping and combusting diesel exhaust particulates which includes a honeycomb filter body having a plurality of parallel cell channels traversing the body from a frontal inlet end to an outlet end thereof, in which a portion of the cell channels are plugged in a non-checkered pattern, and the remaining cell channels are plugged in a checkered pattern.

For the purposes of the present description a checkered pattern refers to an area at either face of the honeycomb in which every other cell is plugged; a non-checkered pattern refers to a pattern other than a checkered pattern.

In one embodiment the diesel exhaust particulate honeycomb filter includes a frontal inlet end and an outlet end, a matrix of thin, porous, intersecting vertically extending walls and horizontally extending walls, which define a plurality of cell channels extending in a substantially longitudinal and mutually parallel fashion between the frontal inlet end and the outlet end; the frontal inlet end includes a first section of cells plugged along a portion of their lengths in a non-checkered pattern and a second section of cells plugged in checkered pattern, the first section of non-checkered plugged cells being smaller than the second section of checkered plugged cells. Preferably, the cells are end-plugged and the first section of non-checkered end-plugged cells forms a circular pattern which is concentric with the frontal inlet end. If the frontal inlet end has a diameter $D_{ff}$ and the first section of non-checkered end-plugged cells has a diameter $d_{fs}$, then $d_{fs}$ is between $½(D_{ff})$ to $¼ (D_{ff})$, and more preferably less than $¼ (D_{ff})$. Up to three-fourth of the cells of the first section may be unplugged. Alternatively, up to one-half of the cells of the first section may be unplugged. Alternatively, up to one-fourth of the cells of the first section may be unplugged.

In another embodiment the diesel exhaust particulate honeycomb filter includes a frontal inlet end, an outlet end, and a plurality of cell channels extending from the frontal inlet end to the outlet end, the cell channels having porous walls; part of the total number of cell channels are end-plugged in a checkered pattern either at the frontal inlet end or at the outlet end, and the remaining cell channels have internal plugs.

In another embodiment the diesel exhaust particulate honeycomb filter includes a frontal inlet end, an outlet end, a group of cell channels extending from the frontal inlet end to the outlet end which are end-plugged in a checkered pattern either at the frontal inlet end or at the outlet end, and another group of partial cell channels which extend partially from the frontal inlet end into the honeycomb filter body, the partial cell channels being unplugged at the frontal inlet end.

The invention is also a method of regenerating a filter by providing a ceramic filter for trapping and combusting diesel exhaust particulates which includes a honeycomb structure as described above and heating the structure to a temperature which would facilitate the combustion of carbon soot.

DETAILED DESCRIPTION OF THE INVENTION

The invention is a ceramic filter for trapping and combusting diesel exhaust particulates which includes a honeycomb structure having a frontal inlet end and an outlet end, a multiplicity of cell channels extending between the frontal inlet end and the outlet end, and sections of checkered plugging and non-checkered plugging at the ends of the honeycomb. The inventive filter design offers fewer hot spots and fewer thermal gradients during regeneration and therefore the inventive filters are significantly more resistant to thermal cracking and melting under conditions encountered in diesel exhaust systems, specifically, during the regeneration of trapped carbon soot.

During this process the temperature of the filter usually rises to a maximum of about 800–1000° C., however, in practicality, temperature spikes in excess of 1400° C. have been observed in filters currently available. In the inventive filters temperatures in the filter during regeneration are reduced by over 300° C., and preferably between about 400 and 500° C.

The invention can also be described as a honeycomb structure having a frontal inlet end and an outlet end, a multiplicity of cell channels extending between the frontal inlet end and the outlet end, the frontal inlet end including at least two regions, a first region where there are more plugged cells (less open frontal area) than in the second region and a second region where the plugging pattern is characterized by a unit cell having at least two honeycomb channels and up to forty-nine honeycomb channels, where the plugging pattern is made by the translation, or translation and rotation of the unit cell and the outlet end has plugs on the cell channels that are open at the frontal inlet end in the second region, wherein the first region is smaller in area than the second region. In one embodiment the first region has a checkered plugging pattern, and the second region has a non-checkered plugging pattern.

Figure 1:
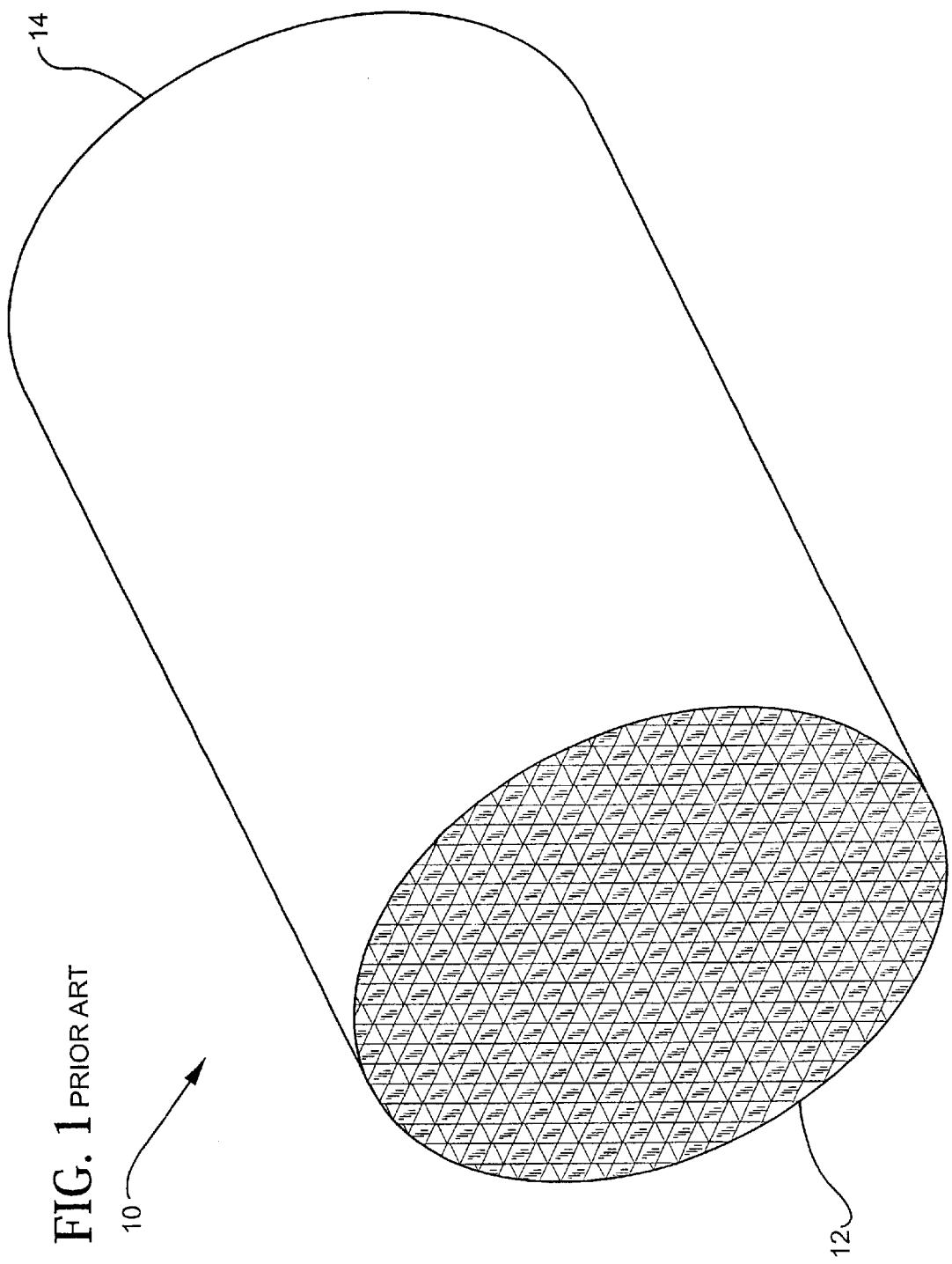
FIG. 1 is an illustration of a prior art honeycomb diesel particulate filter having checkered plugging.

Referring now to FIG. 1 therein illustrated is a comparative example of a prior art wall-flow ceramic filter 10 which has a checkered plugging pattern on the frontal inlet end 12, and repeating on the outlet end 14 (not shown) but in a reverse pattern, such that cells that are plugged on the frontal inlet end 12 are open on the outlet end 14 and vice versa. Wall flow filters are so named since the flow paths resulting from alternate channel plugging (i.e., each cell is plugged only at one end) require the exhaust being treated to flow through the porous ceramic cell walls prior to exiting the filter. For the purposes of the present invention the frontal inlet end is simply that part of the honeycomb through which the exhaust gas enters, and outlet end is that part of the honeycomb through which the exhaust gas exits.

Figure 2:
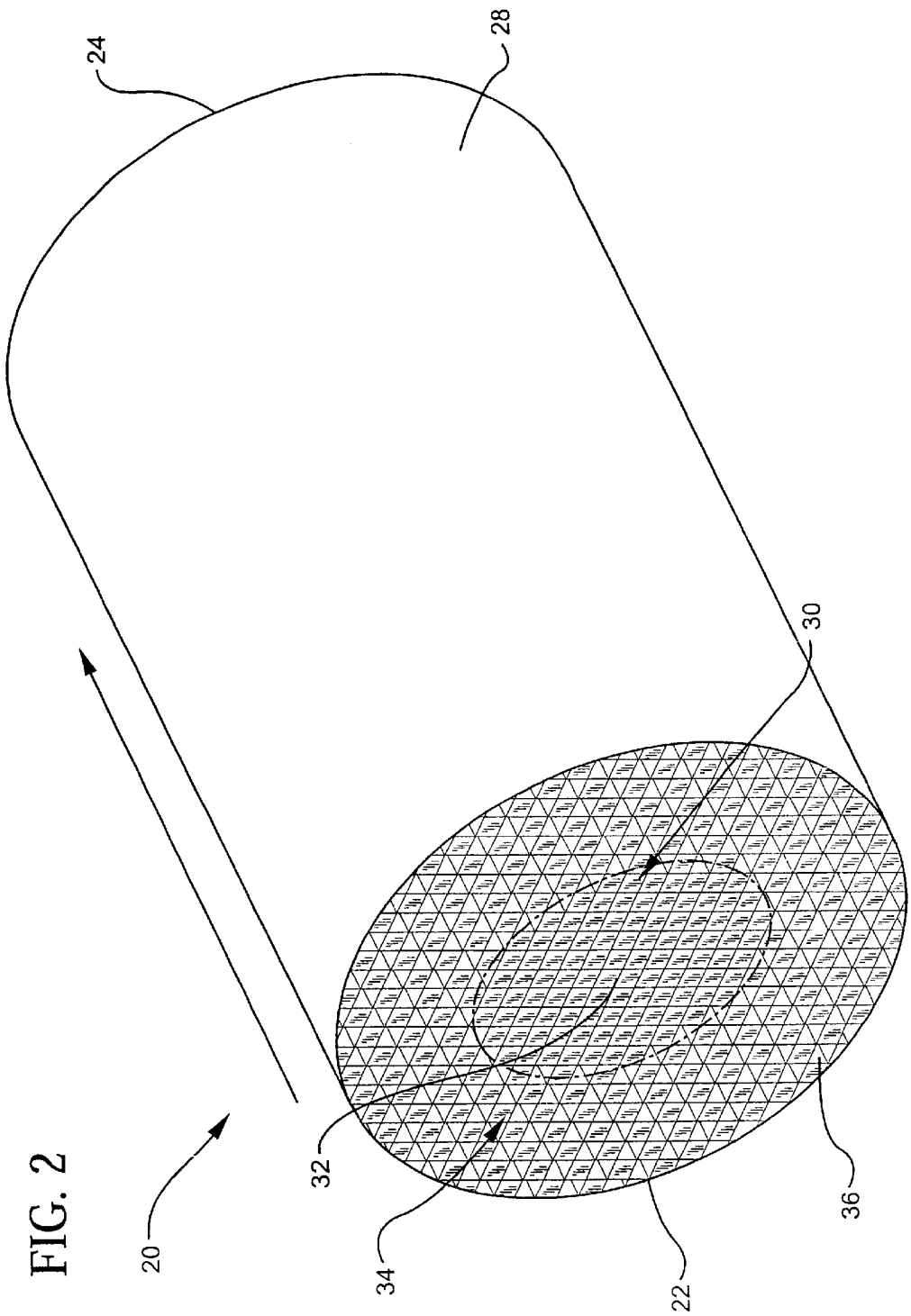
FIG. 2 is an illustration of an embodiment of the inventive diesel particulate filter whose frontal inlet end includes checkered and non-checkered end-plugged cells, the non-checkered plugged cells forming a circular pattern, wherein all the cells within this circular pattern are plugged.

An embodiment of the present invention is shown in FIG. 2. Honeycomb structure 20, has a frontal inlet end 22 and an outlet end 24, and a multiplicity of cell channels or cells 26 which extend between frontal inlet end 22 and outlet end 24 to form body 28. The cell channels have porous walls and run substantially longitudinal and mutually parallel fashion between the frontal inlet end and the outlet end.

Frontal inlet end 22 includes a first section 30 of cells which are end-plugged in a non-checkered pattern labeled with the reference number 32; specifically, all cells 32 are plugged in first section 30. Frontal inlet end 22 also includes a second section 34 of cells which are end-plugged in a checkered pattern and are labeled with reference number 36. For the purposes of the present invention cells which are end-plugged are cells which are plugged at the ends typically to a depth of about 5 to 20 mm, although this can vary. The cells (not shown) on outlet end 24 may be plugged in a checkered pattern or may be plugged in a manner as described on the frontal inlet end 22.

The honeycomb may be plugged either before or after firing with a paste having the same or similar composition to that of the green body, using appropriate amounts of a liquid phase to impart a workable viscosity, optionally with the addition of binders and plasticizers, as described in U.S. Pat. No. 4,329,162.

Figure 3:
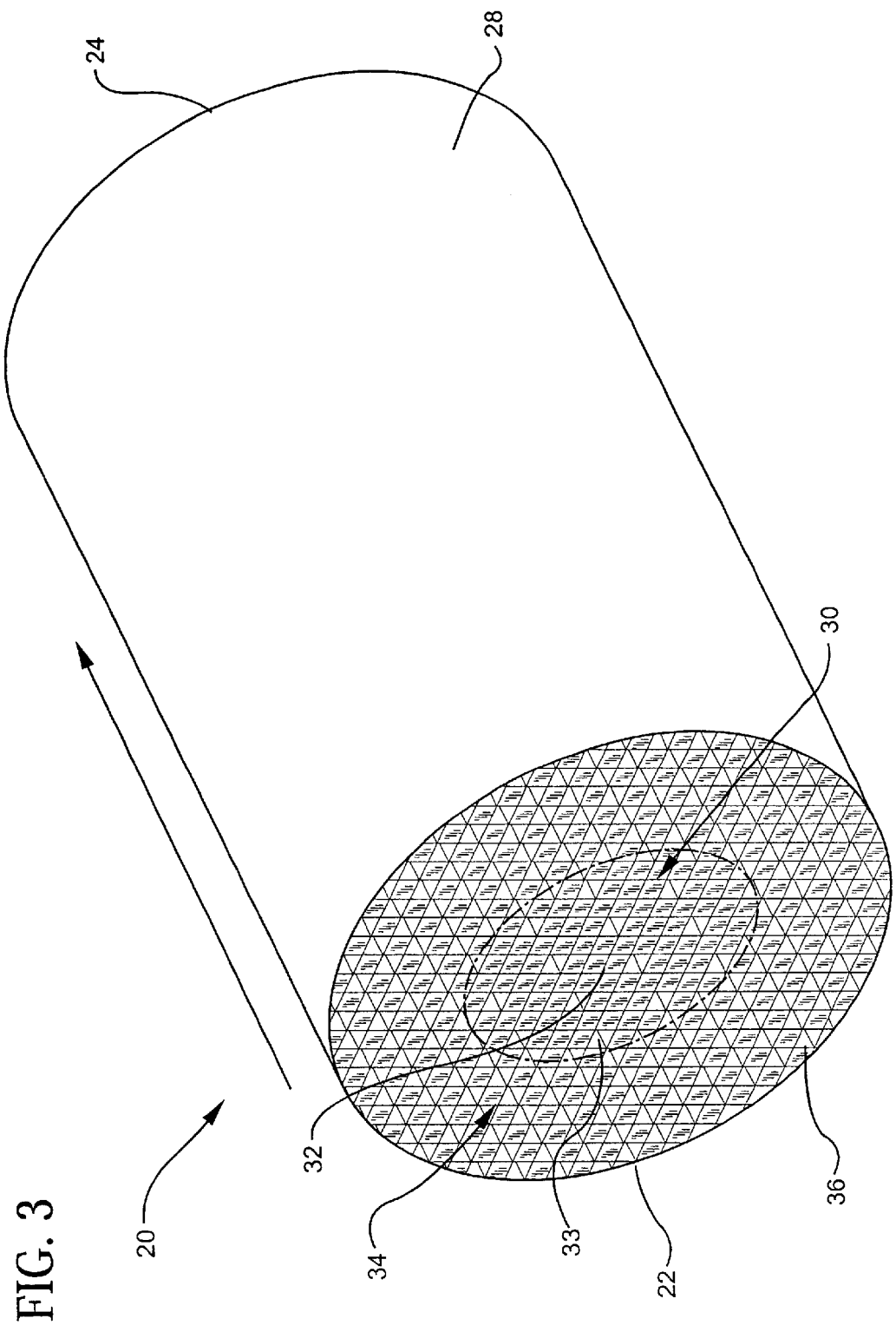
FIG. 3 is an illustration of another embodiment of the inventive diesel particulate filter whose frontal inlet end includes checkered and non-checkered end-plugged cells, the non-checkered plugged cells forming a circular pattern, wherein three-fourth of the cells within this circular pattern are plugged.
Figure 4:
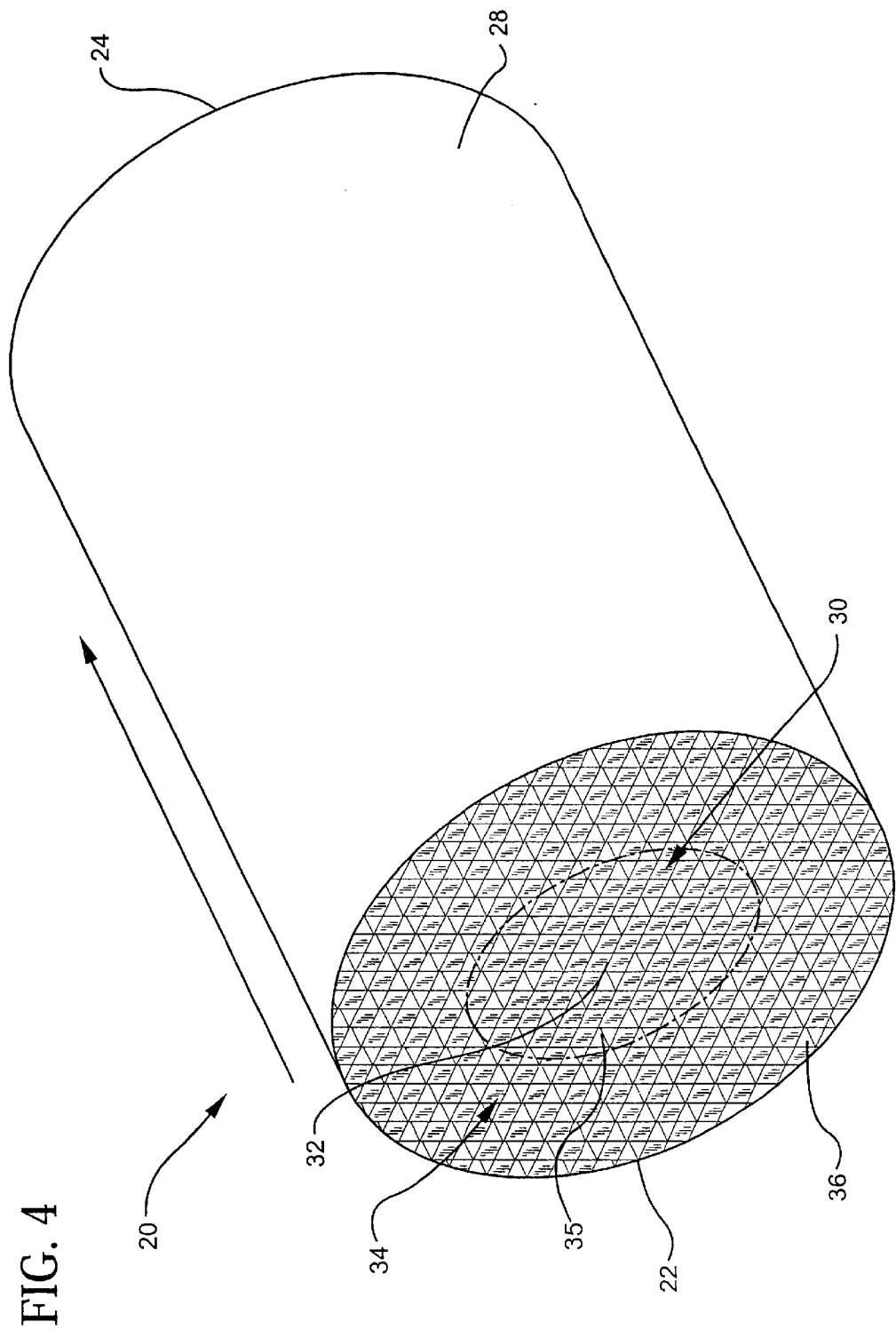
FIG. 4 is an illustration of another embodiment of the inventive diesel particulate filter whose frontal inlet end includes checkered and non-checkered end-plugged cells, the non-checkered plugged cells forming a circular pattern, wherein one-fourth of the cells within this circular pattern are plugged.

In FIG. 2, all cells within first section 30 are plugged, however, in the embodiment of FIG. 3, one fourth of cells 32 are unplugged, which are labeled by reference number 33. In still another embodiment as shown in FIG. 4, three fourth of cells 32 are unplugged which are labeled by the reference number 35. The embodiment of FIG. 2, in which all of the cells in first section 30 are end-plugged, is most preferred.

In the embodiments of FIGS. 2, 3 and 4 first section 30 has a circular shape and is concentric with frontal inlet end 22. If frontal inlet end 22 has a diameter $D_{ff}$ than the diameter of first section 30, $d_{fs}$ equals the relation $(\frac{1}{2}-\frac{1}{4})(D_{ff})$. Preferably, $d_{fs}$ is less than $(\frac{1}{4})(D_{ff})$. Therefore, for example if frontal inlet end 22 has a diameter of about 6 inches, first section 30 has a diameter of about 1.5–3 inches, and more preferably less than 1.5 inches.

Figure 5:
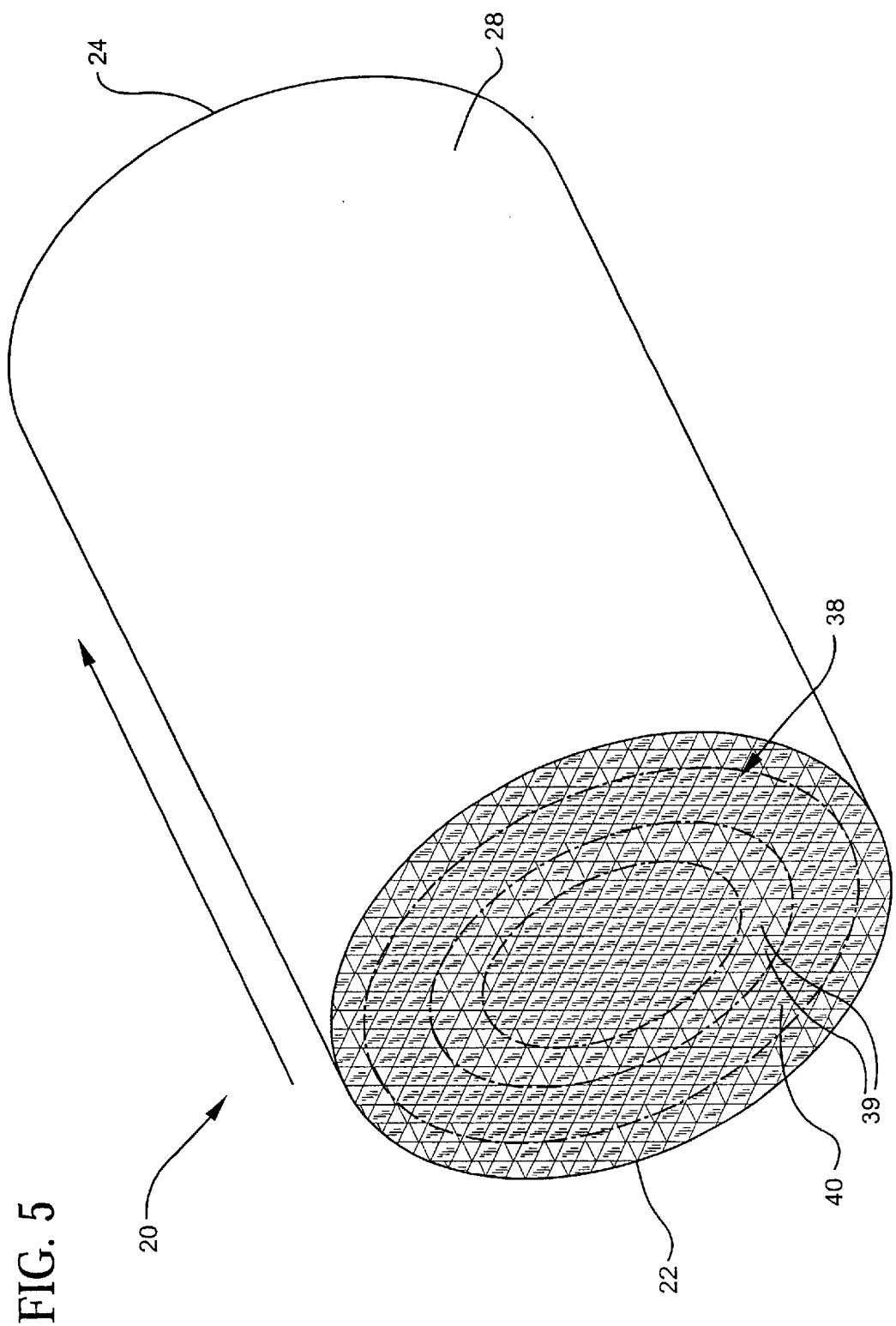
FIG. 5 is an illustration of another embodiment of the inventive diesel particulate filter whose frontal inlet end includes checkered and non-checkered end-plugged cells, the non-checkered plugged cells forming a circular pattern and an adjacent ring, wherein all of the cells in the circular pattern and in the adjacent ring are plugged.
Figure 6:
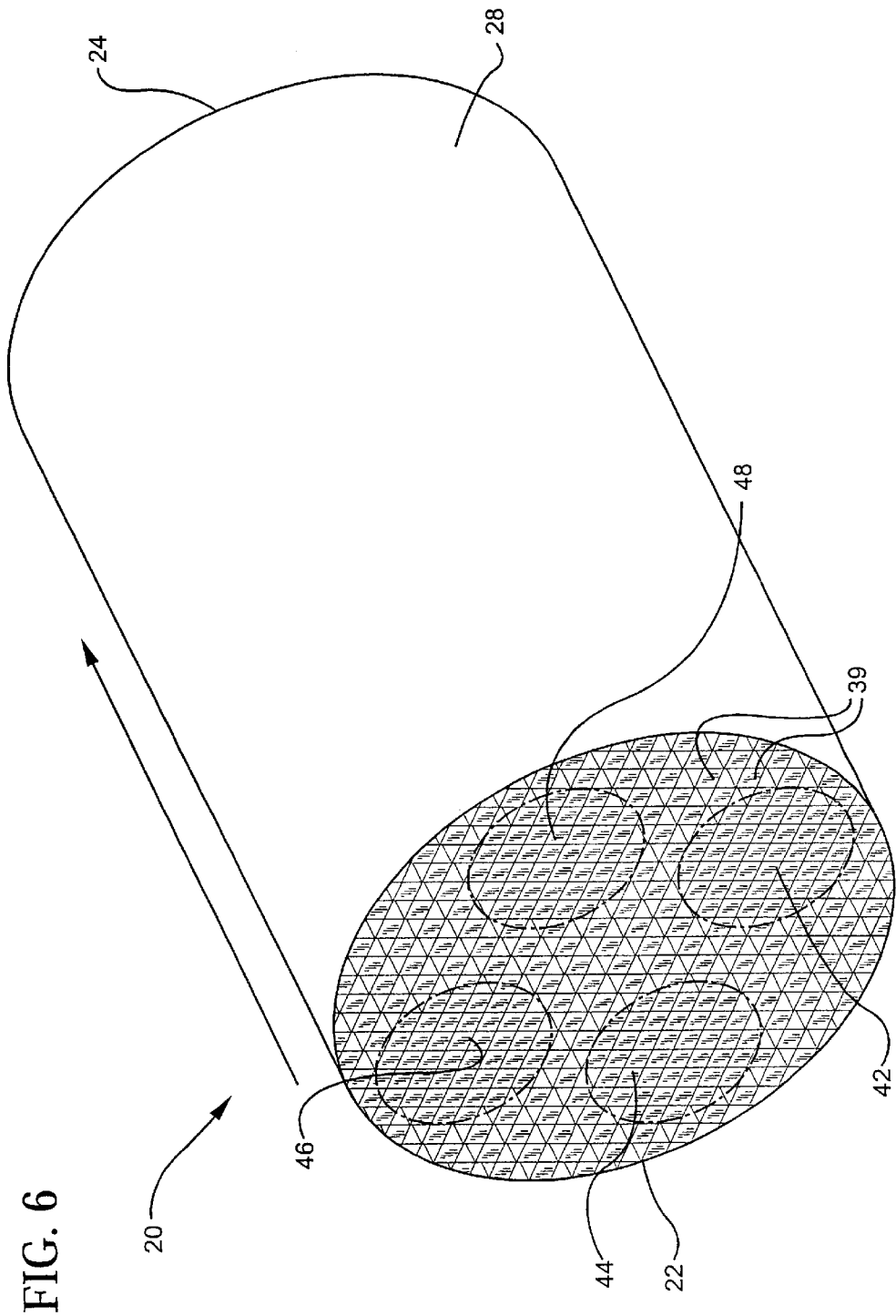
FIG. 6 is an illustration of another embodiment of the inventive diesel particulate filter whose frontal inlet end includes checkered and non-checkered end-plugged cells, the non-checkered plugged cells forming four circular patterns across the frontal inlet end, wherein all of the cells within the four circular patterns are plugged.
Figure 7:
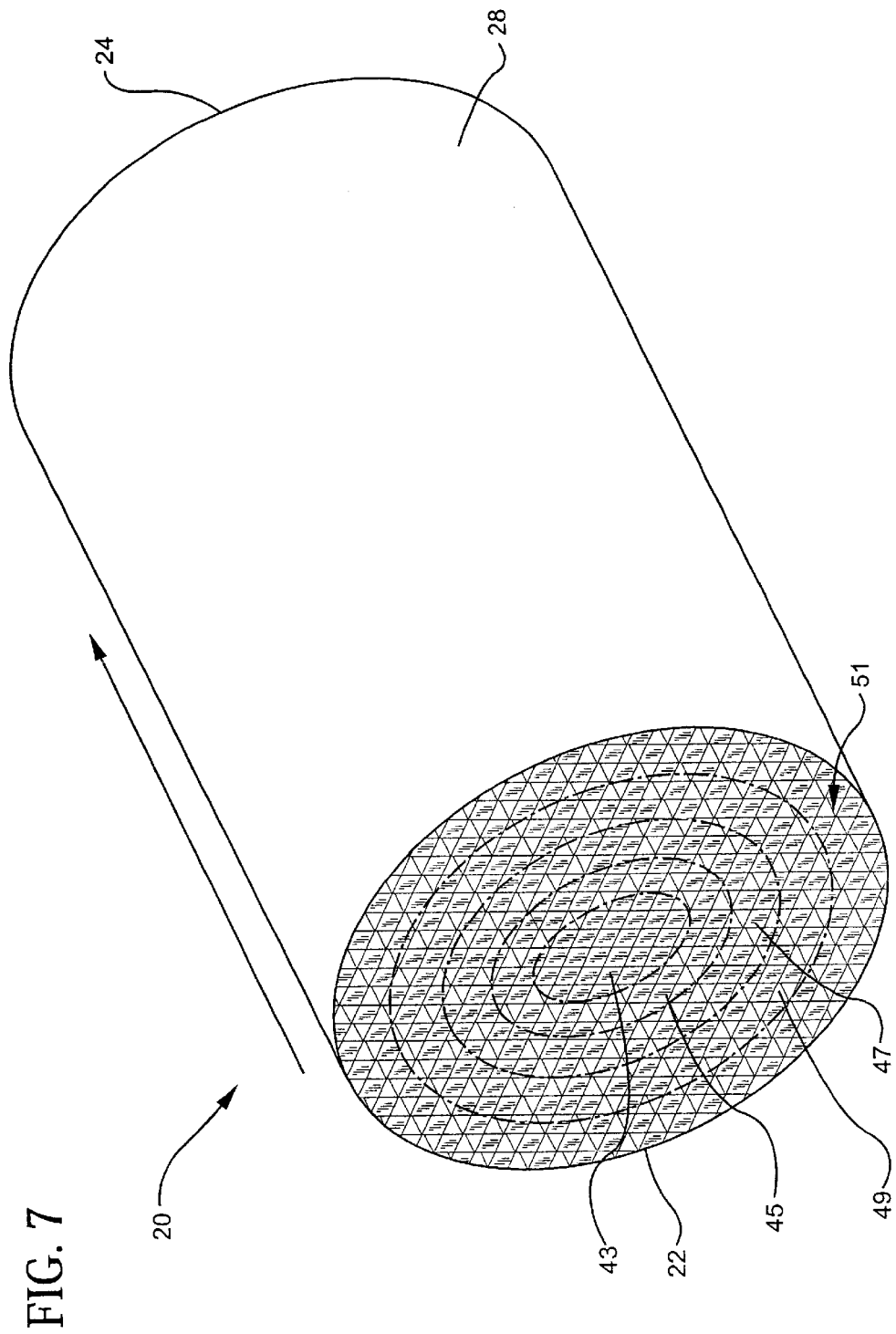
FIG. 7 is an illustration of another embodiment of the inventive diesel particulate filter whose frontal inlet end includes checkered and non-checkered end-plugged cells, the non-checkered plugged cells forming four contiguous rings across the frontal inlet end, wherein all of the cells within the four contiguous rings are plugged.

Referring now to FIGS. 5, 6 and 7 therein illustrated are other embodiments of the present invention. In FIG. 5 frontal inlet end 22 includes a circular pattern 38 and an adjacent ring 40. All cells of circular pattern 38 and adjacent ring 40 are end-plugged, forming a non-checkered pattern. The remaining cells 39 are alternately end-plugged, forming a checkered pattern.

In FIG. 6 frontal inlet end 22 includes four equal circular patterns 42, 44, 46, and 48. All cells of each circular pattern are all end-plugged, forming a non-checkered pattern. The remaining cells 39 are alternately end-plugged, forming a checkered pattern.

In FIG. 7 frontal inlet 22 includes a circular pattern 43 and four contiguous rings 45, 47, 49 and 51. All of the cells of circular pattern 43 are end-plugged, three-fourth of the cells in ring 45 are end-plugged, one-half of the cells are end-plugged in ring 47, one-fourth of the cells are end-plugged in ring 49 and the cells of ring 51 are alternately plugged in a checkered pattern.

The inventive filters have an open frontal section area of less than 50% of the open frontal section area of a checkerboard plugged front face, preferably less than 25% and more preferably less than 15%. For the purposes of the present description, open frontal section area is simply the area at the frontal inlet end made up by the open cell channels through which the exhaust stream enters the filter.

Figure 8:
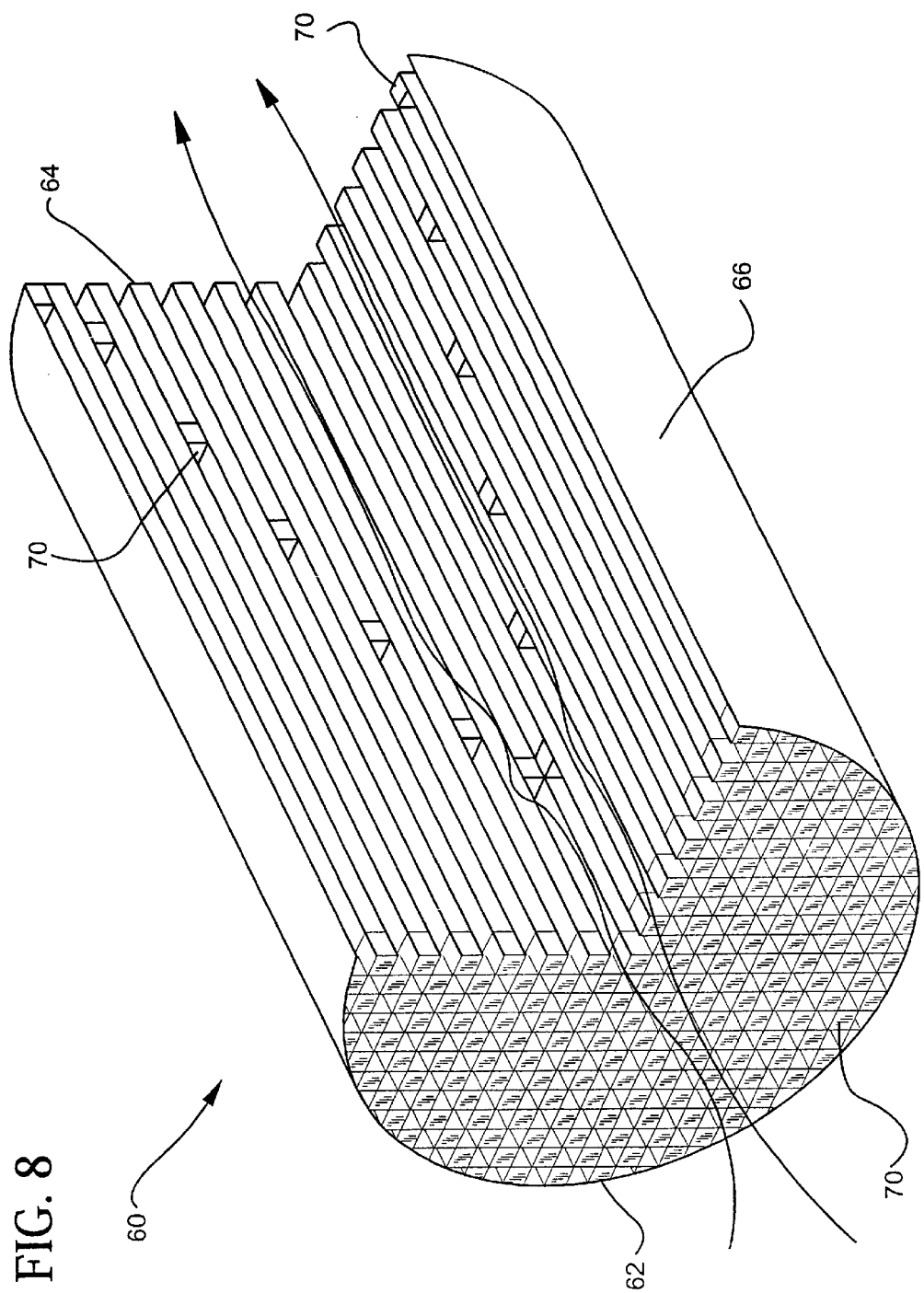
FIG. 8 is an illustration of another embodiment of the inventive diesel particulate filter which contains end-plugged cells and cells having plugs at a distance within the channels.

Another embodiment of the present invention is shown in FIG. 8. Honeycomb structure 60 has a frontal inlet end 62 and an outlet end 64, and a body 66. Cells 68 are end-plugged 70 either at frontal inlet end 62 or outlet end 64, but not at both. End-plugs 70 are preferably in a checkered pattern, but other patterns are also equally suitable. Cells 72 have internal plugs 74 which are within the channels as illustrated. Internal plugs 74 form a non-checkered pattern.

Figure 9:
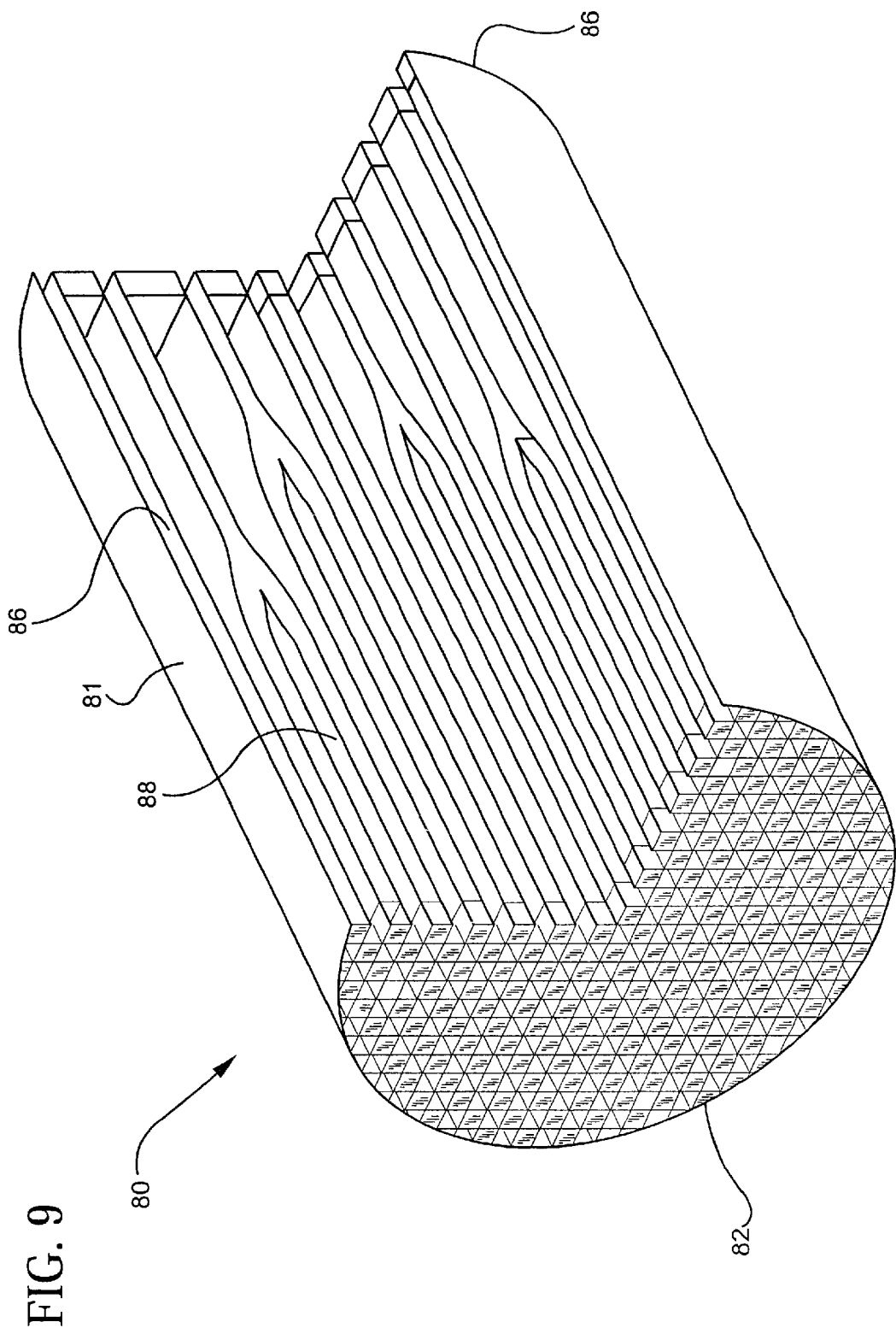
FIG. 9 is an illustration of another embodiment of the inventive diesel particulate filter which contains channels which extend partially into the honeycomb body.

Another embodiment of the present invention is shown in FIG. 9. Honeycomb structure 80 has a frontal inlet end 82 and an outlet end 84. Cells 86 extend between frontal inlet end 82 and outlet end 84. These cells are end-plugged in a checkered pattern at frontal inlet end 82. Cells channels 88 are partial cell channels; specifically cell channels 88 extend partially from the frontal inlet end 82 into honeycomb body 81. Cells 88 have an open end 87 and a closed end 89, the closed end 89 being the end where the partial cell channels 88 terminate within the honeycomb body 81.

Honeycomb structures of the type herein described have cellular densities between about 1.5 to 46.5 cells/cm$^2$ (about 10 and 300 cells/in$^2$), more typically between about 15.5 to 46.5 cells/cm$^2$ about (100 and 300 cells/in$^2$). Wall thicknesses can vary upwards from the minimum dimension providing structural integrity, about 0.0254 cm (about 0.010 in.), but are generally less than about 0.051 cm (about 0.020 in.) to minimize filter volume.

Interconnected open porosity of the thin wall may vary, but is most generally greater than about 25% of thin wall volume and usually greater than about 35% to allow fluid flow through the thin wall longer dimensions. Diesel filter integrity becomes questionable above about 70% open pore volume; volumes of about 50% are therefore typical. For diesel particulate filtration it is believed that the open porosity may be provided by pores in the channel walls having mean diameters in the range of about 1 to 60 microns, with a preferred range between about 10 and 50 microns.

The honeycombs may be made of any suitable material, such as ceramic, glass-ceramic and metal. Especially suited are ceramic materials, such as those that yield cordierite, mullite or a mixtures of these on firing, and silicon carbide.

The honeycomb structures may be either circular or square in cross-section. However, the filter of course need not have these shapes, but may be oval, rectangular, or any other cross-sectional shape that may be dictated by the particular exhaust system design selected for use.

A suitable method of making the honeycomb structure shown in FIG. 9 is using solid freeform manufacturing, particularly binder ink jet printing to produce the inventive structures, as disclosed in U.S. Pat. No. 5,204,055, herein incorporated by reference in its entirety. Briefly, a thin powder layer is placed on a movable supporting bed. An ink jet type head or a row of ink jet heads is passed over the powder bed and computer control is used to deposit a liquid binder to selected areas in the powder bed. The supporting bed is indexed downward and a new layer of powder is applied to the bed. The process repeats itself and a structure is built up from the binder and powder. When the desired structure is obtained, the loose powder is removed from the structure. The structure may optionally be sintered to open or closed porosity.

A significant performance advantage of the inventive filters is expected to reside in a reduction in the temperature of the filter during regeneration of accumulated carbon soot, resulting in improved filter resistance during both controlled and uncontrolled regenerations.

The inventive filters can be regenerated by heating the diesel particulate filter to a temperature where the carbon soot is combusted.

To more fully illustrate the invention, the following non-limiting examples are presented.

EXAMPLE 1 (COMPARATIVE)

A cordierite honeycomb structure having a diameter of 14.4 cm (5.66 inch) and a length of 15.24 cm (6 inch) with a cell density of 200 cells/in$^2$ and a wall thickness of 30.48 cm (12 inch) was end-plugged in a checkered plugging pattern on both the frontal inlet end and at the outlet end and is the control or comparative diesel particulate filter. The filter was loaded with 19.8 grams of carbon soot at a rate of about 8 grams per liter and then regenerated by flowing hot gas at about 615° C. at a rate of 500 liter/minute with an oxygen content of 18%, through the filter which was originally at room temperature.

Figure 10:
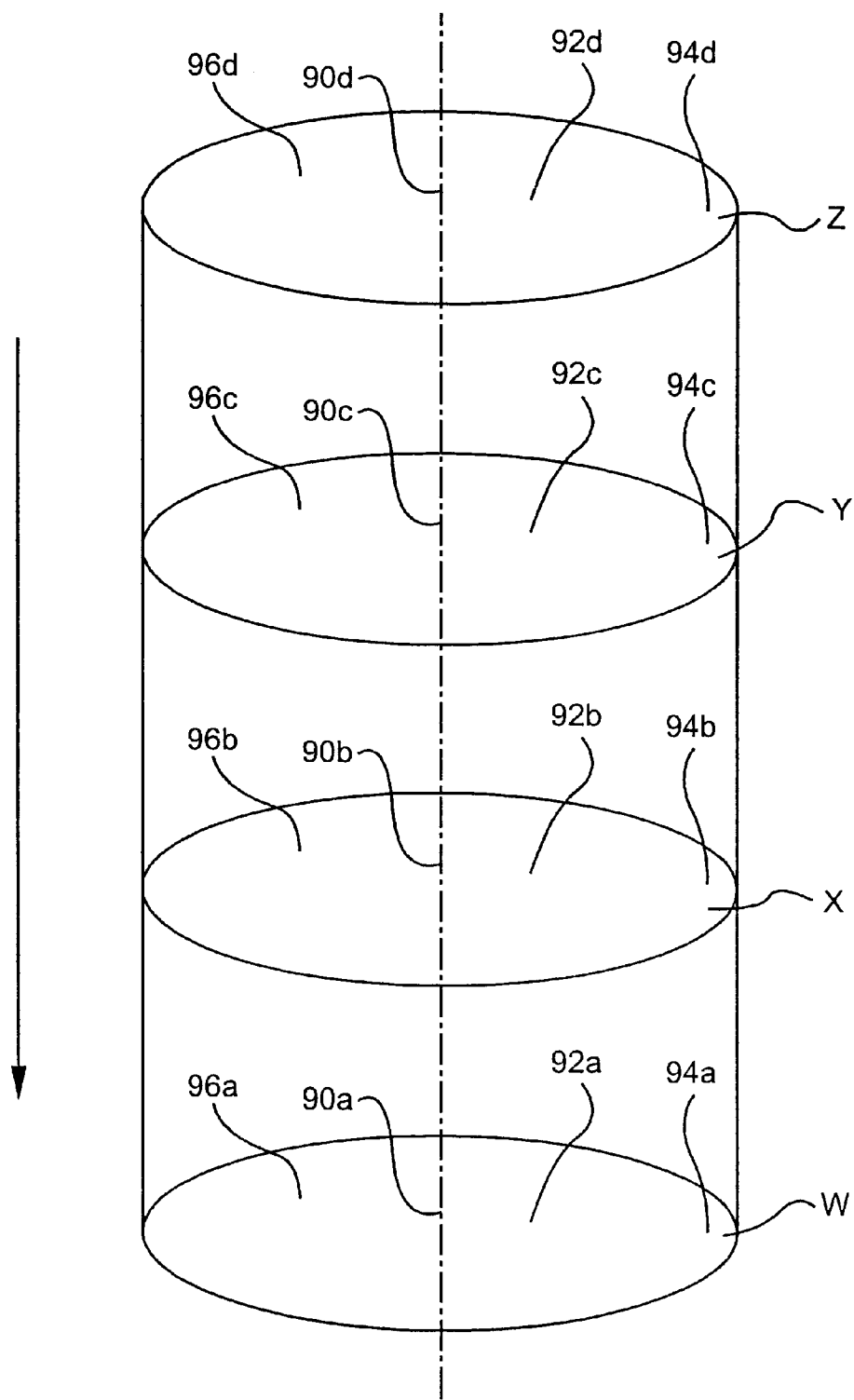
FIG. 10 shows the temperatures measured during regeneration in the control diesel particulate filter of Example 1.

The temperature of the control filter was measured during regeneration with thermocouples placed at selected points within the filter. The thermocouples were arrayed in four sets of four along the flow axis and along four planes perpendicular to the flow axis, as illustrated in FIG. 10. The four planes are W at 2.54 cm (1 inch), X at 5.92 cm (2.33 inch), Y at 9.32 cm (3.67 inch) and Z at 12.7 cm (5 inch), the distances being from the outlet end of the filter.

The first set of four thermocouples, 90, was aligned along the center axis of the honeycomb at each of the four planes. The second set of four thermocouples, 92, was aligned at an arc having a diameter of about 2.8 cm (1.1 in) from the center axis. The third set of thermocouples, 94, was aligned near the outer edge. The fourth set of thermocouples, 96, was aligned in between 92 and 94, at an arc having a diameter of about 4.6–4.7 cm from center axis.

Figure 11:
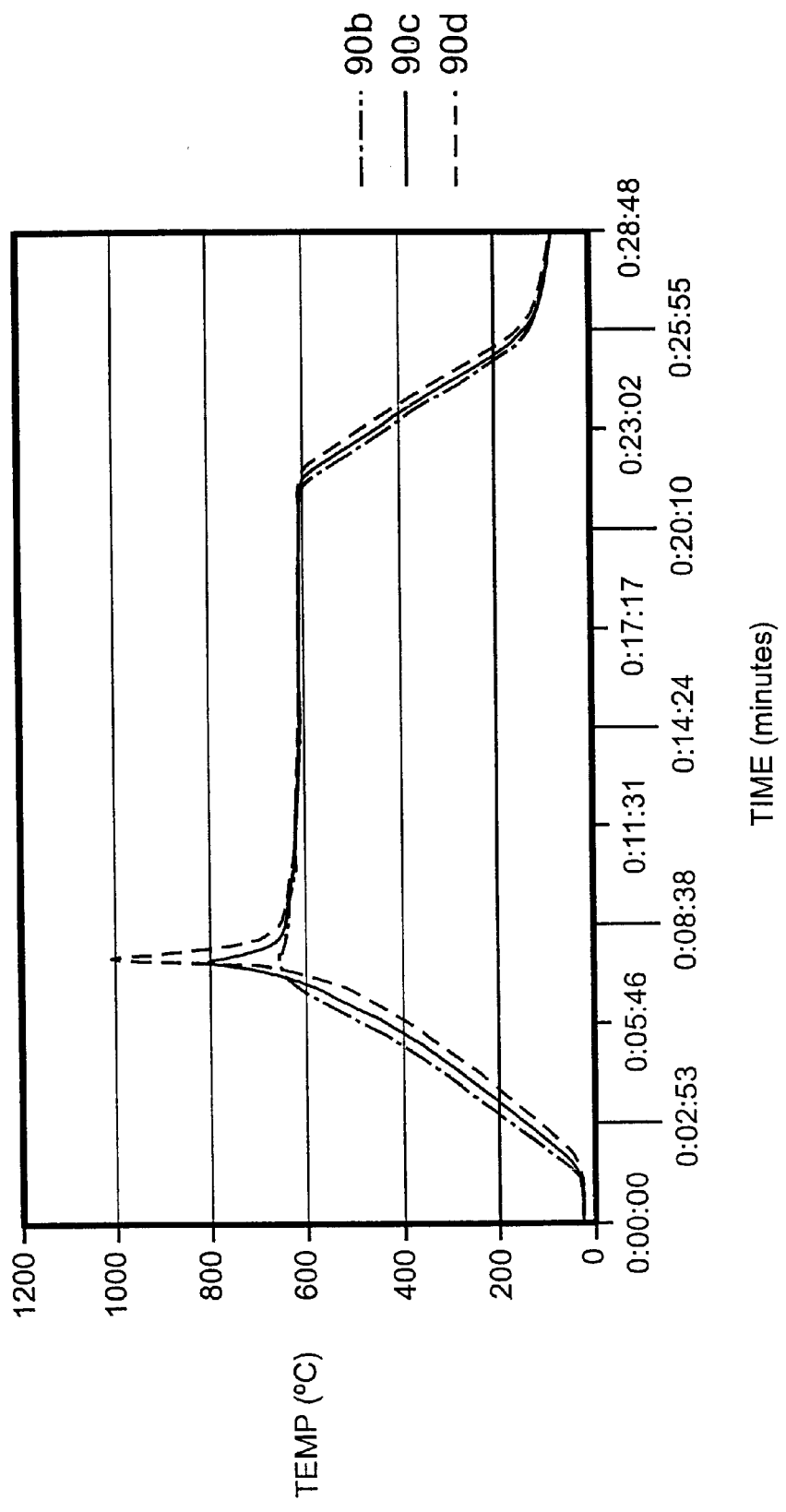
FIG. 11 shows the time-temperature graph for thermocouple set 90 in Example 1.
Figure 12:
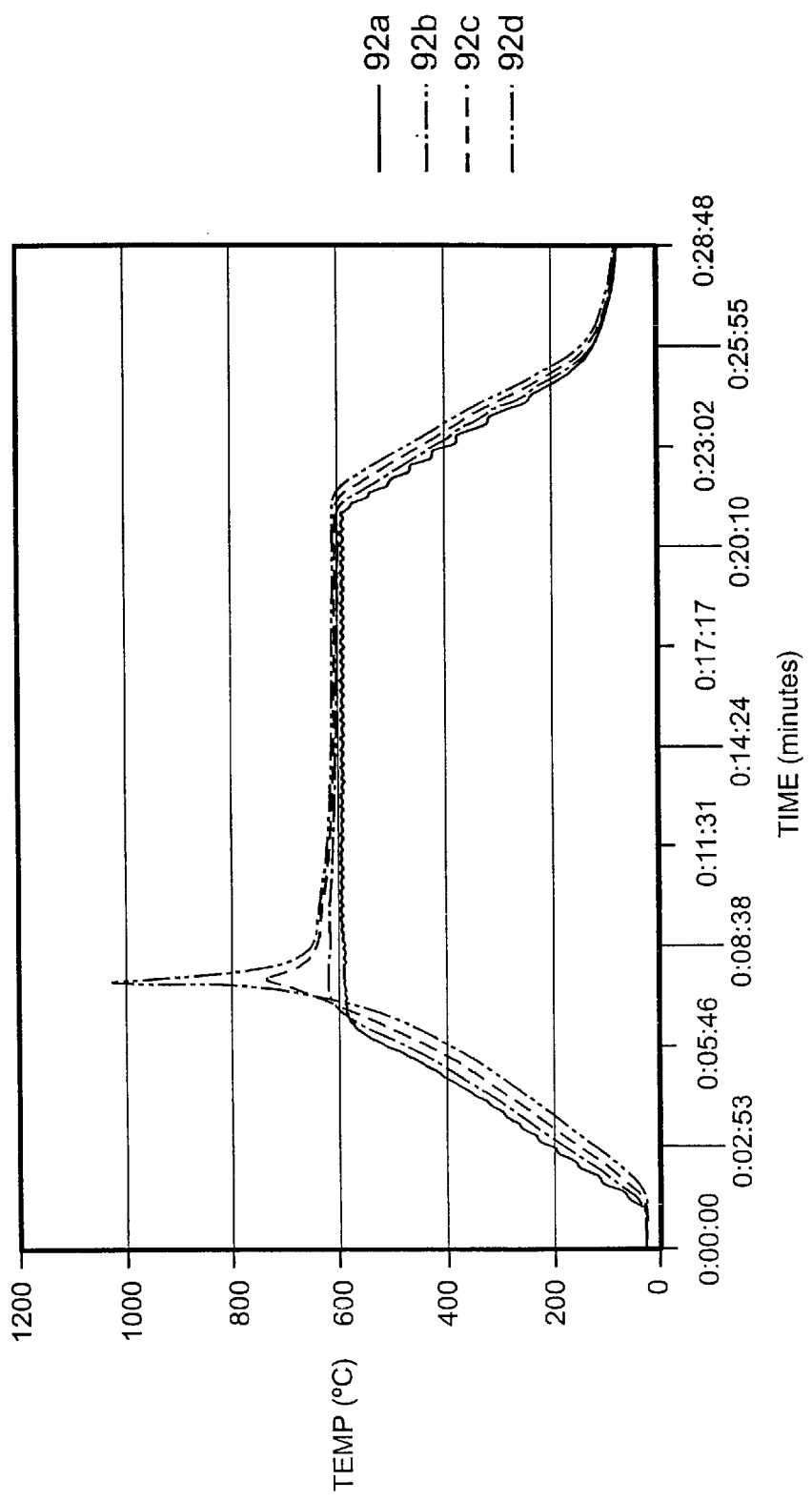
FIG. 12 shows the time-temperature graph for thermocouple set 92 in Example 1.
Figure 13:
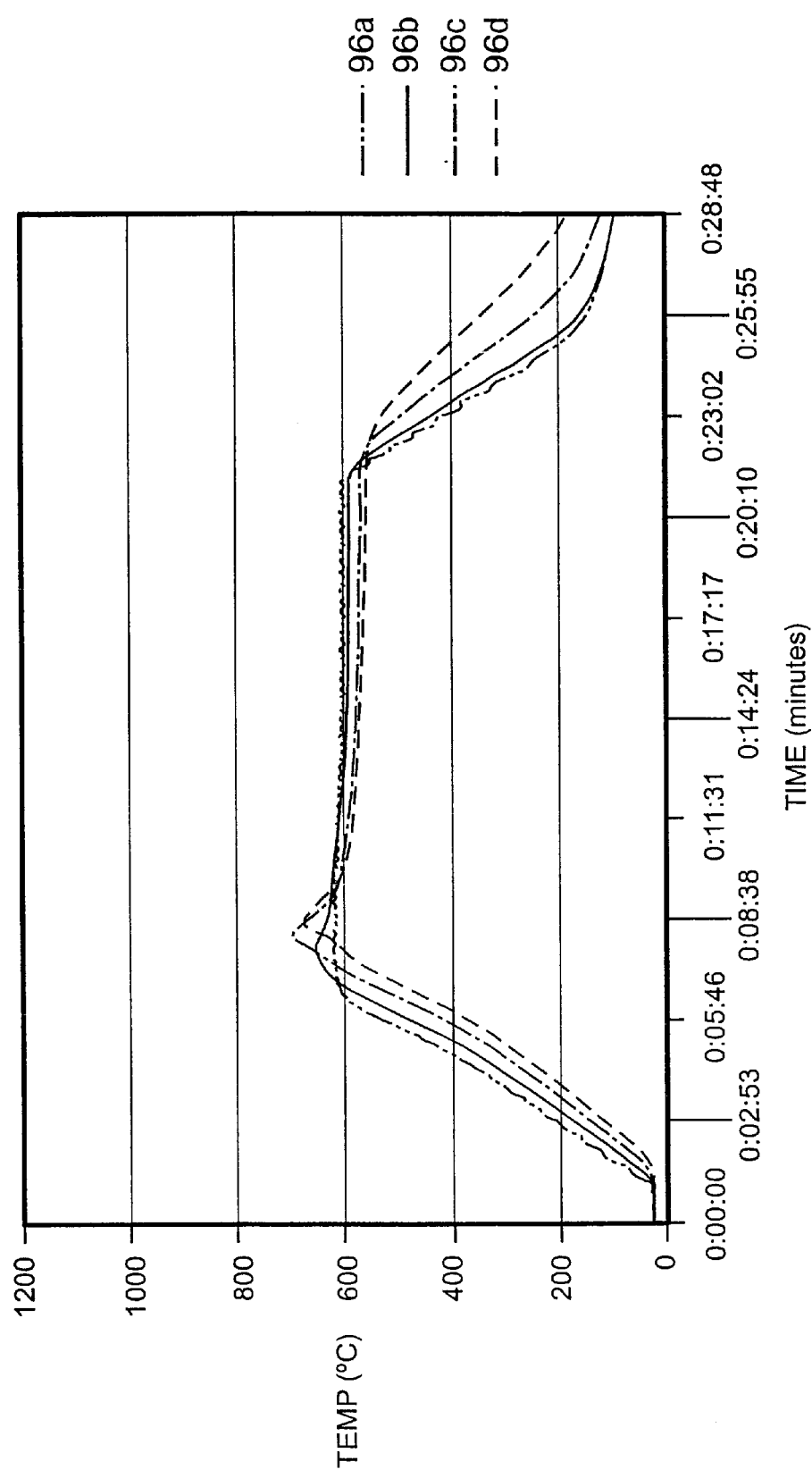
FIG. 13 shows the time-temperature graph for thermocouple set 96 in Example 1.

FIGS. 11, 12 and 13 present the temperatures curves measured by thermocouples sets 90, 92 and 96, respectively. About 14.8 grams of soot were burnt during the regeneration process for a period of time of about 28 minutes. The peak regeneration temperatures measured were 1019° C. at thermocouple 92a and 1008° C. at thermocouple 90a. Therefore, based on this data, for a 14.4 cm (5.66 in) diameter by 15.24 cm (6 in) long honeycomb having a checkerboard plugging pattern, the hottest region is between about 2 cm to 5 cm (about 1–2 in) around the center axis of the filter.

EXAMPLE 2 (INVENTIVE)

An inventive diesel particulate filter, as shown in FIG. 2, having a diameter of 14.4 cm (5.66 inch) and a length of 15.24 cm (6 inch), made of cordierite and having a cell density of 200 cells/in$^2$ and a wall thickness of 30.48 cm (12 inch) was loaded with 19.8 grams of carbon soot at a rate of about 8 grams per liter. The filter was then regenerated by flowing hot gas at about 615° C. at a rate of 500 liter/minute with an oxygen content of 18%, through the filter which was originally at room temperature.

Figure 14:
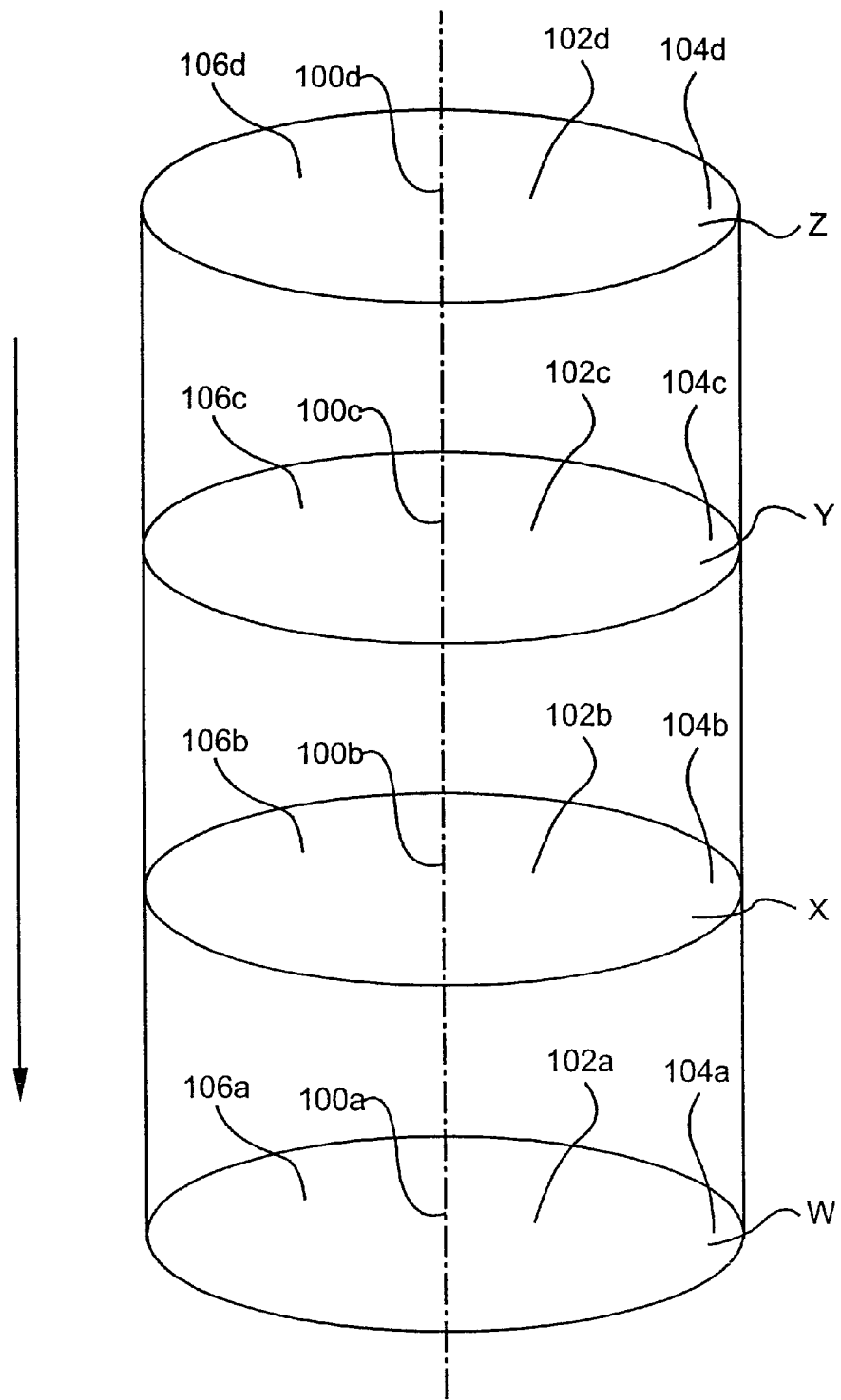
FIG. 14 shows the temperatures measured during regeneration in the inventive diesel particulate filter of Example 2.

Again the temperature of the filter was measured during regeneration as explained above in Example 1. FIG. 14 shows the thermocouple arrangement for this inventive example.

Figure 15:
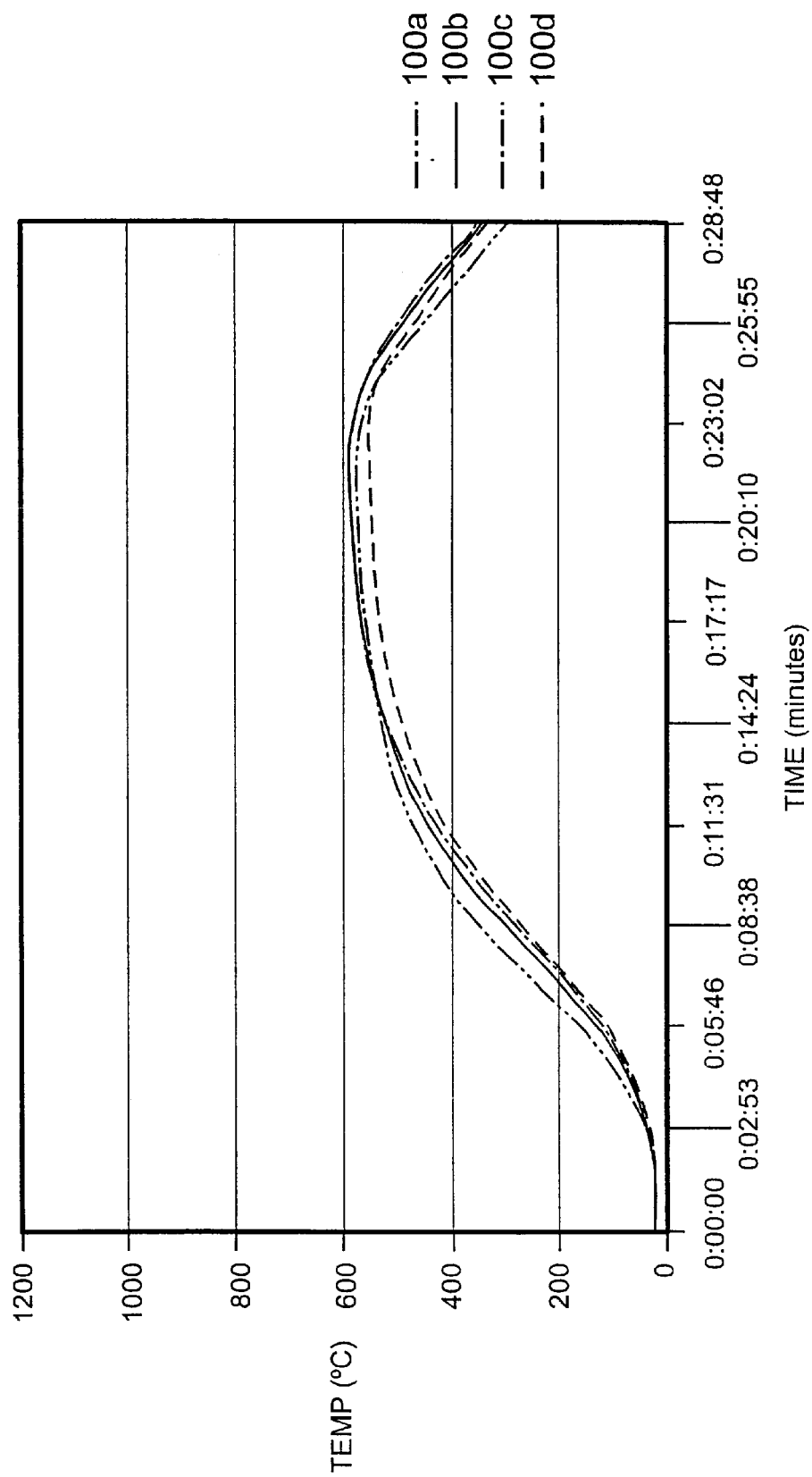
FIG. 15 shows the time-temperature graph for thermocouple set 100 in Example 2.
Figure 16:
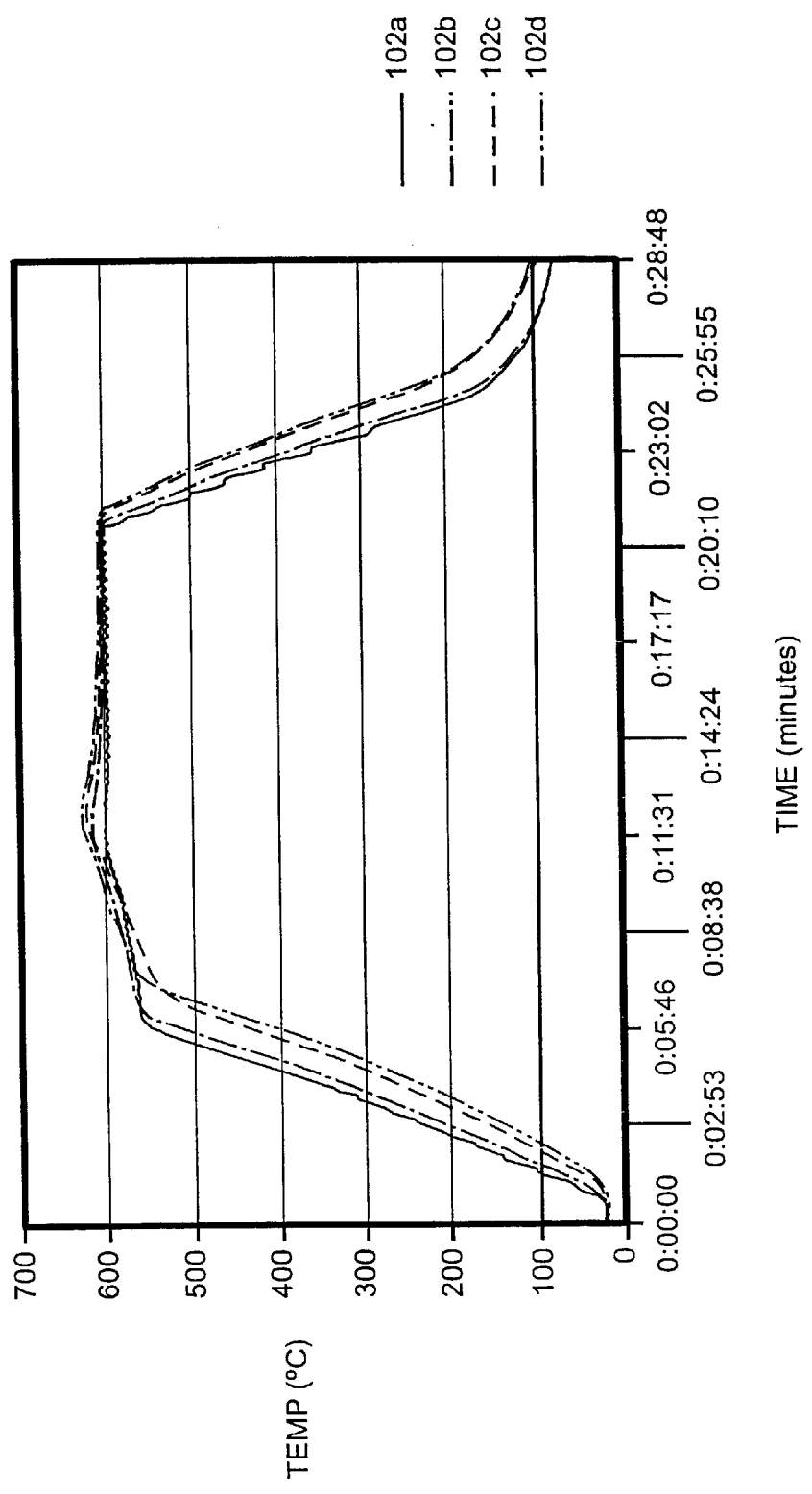
FIG. 16 shows the time-temperature graph for thermocouple set 102 in Example 2.
Figure 17:
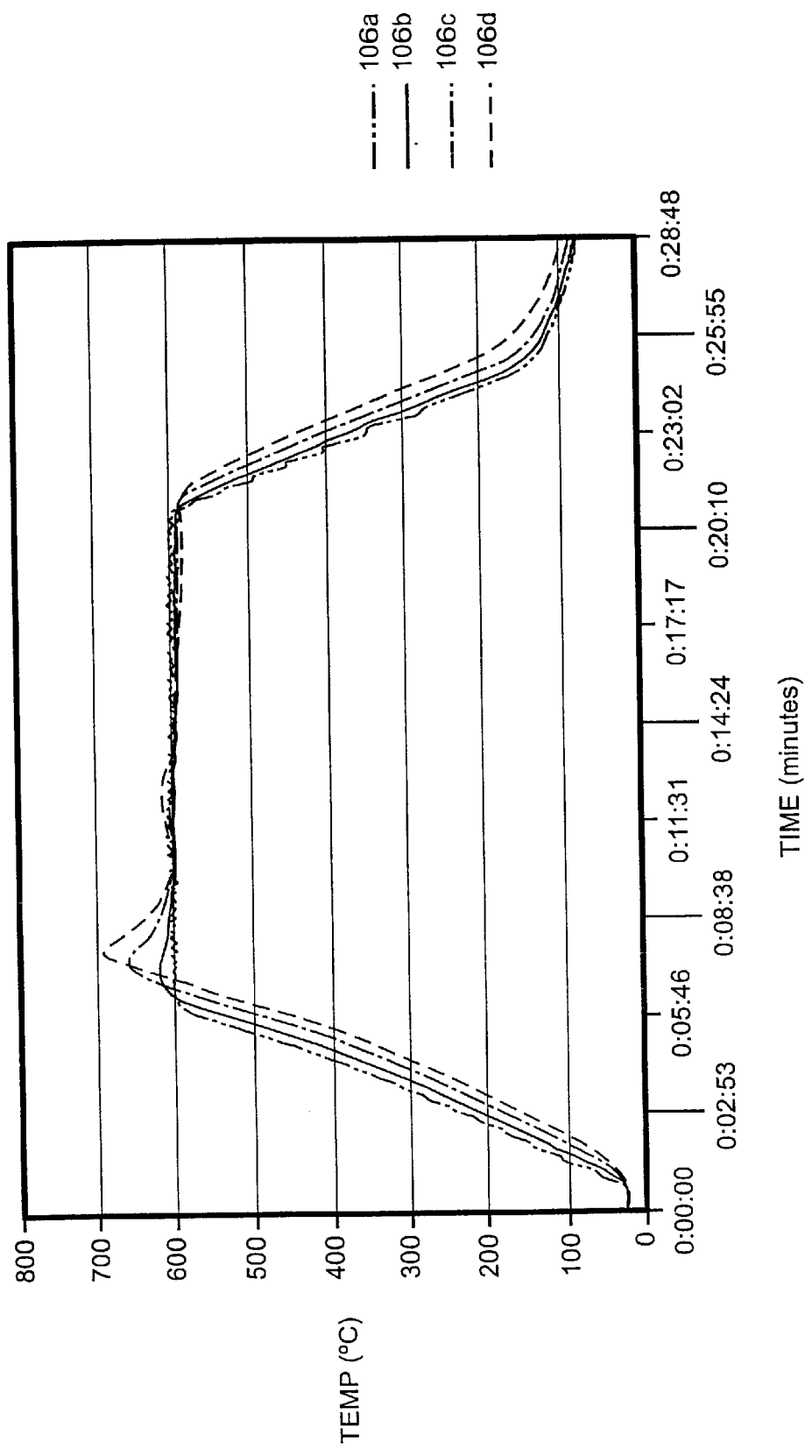
FIG. 17 shows the time-temperature graph for thermocouple set 106 in Example 2.

FIGS. 15, 16 and 17 present the temperatures curves measured by thermocouples sets 100, 102, and 106, respectively. About 14.8 grams of soot were burnt during the regeneration process for a period of time of about 28 minutes. The peak regeneration temperatures measured were 691° C. at thermocouple 106a and 657° C. at thermocouple 106b. The regeneration temperature achieved at 100a was 551° C., 457 degrees lower than the regeneration temperature at 90a temperature in Example 1. The regeneration temperature achieved at 102a was 628° C., 391° C. lower than regeneration temperature at 92a in Example 1. Therefore, the maximum regeneration temperature in the inventive filter has been lowered by more than 350° C. of the maximum regeneration temperature of an art-known cordierite substrates.

It is claimed:

1. A ceramic filter for trapping and combusting diesel exhaust particulates comprising a honeycomb filter body composed of porous ceramic material and including a plurality of parallel cell channels traversing the body from a frontal inlet end to an outlet end thereof, the inlet end having a center, wherein:

a first section of adjacent cell channels at the center of the frontal inlet end all have plugs, forming a non-checkered pattern thereat, and a second section including the remaining cell channels outside the first section, the cell channels in the second section being plugged in a checkered pattern.

2. The ceramic filter of claim 1, wherein the plugs are the end of the cell channels.

3. The ceramic filter of claim 2, wherein the outlet end comprises cell channels end-plugged in a checkered pattern.

4. The ceramic filter of claim 2, wherein the first section is a circular pattern at the center of the frontal inlet end.

5. The ceramic filter of claim 4, wherein the frontal inlet end has a diameter $D_{ff}$.

6. The ceramic filter of claim 5, wherein the first section of non-checkered end-plugged cells has a diameter $d_{fs}$.

7. The ceramic filter of claim 6, wherein $d_{fs}$ is between $½(D_{ff})$ to $¼ (D_{ff})$.

8. The ceramic filter of claim 7, wherein $d_{fs}$ is less than $¼ (D_{ff})$.

9. The ceramic filter of claim 4, wherein up to three-fourth of the cells of the first section are plugged, the remaining one-fourth are unplugged.

10. The ceramic filter of claim 4, wherein up to one-half of the cells of the first section are plugged, the remaining half are unplugged.

11. The ceramic filter of claim 4, wherein up to one-fourth of the cells of the first section are plugged, the remaining three-fourth are unplugged.

12. The ceramic filter of claim 3, wherein the first section further includes a ring of all plugged cell channels adjacent a circular pattern at the center of the frontal inlet end.

13. The ceramic filter of claim 1, wherein the ceramic filter is composed substantially of cordierite.

14. The ceramic filter of claim 1, wherein the ceramic filter is composed substantially of silicon carbide.

15. A diesel exhaust particulate honeycomb filter comprising a frontal inlet end and an outlet end, a matrix of thin, porous, intersecting vertically extending walls and horizontally extending walls, which define a plurality of cell channels extending in a substantially longitudinal and mutually parallel fashion between the frontal inlet end and the outlet end, wherein the frontal inlet end has a first section of cells plugged along a portion of their lengths in a non-checkered pattern and a second section of cells plugged in checkered pattern, wherein the first section of non-checkered plugged cells is smaller than the second section of checkered plugged cells.

16. A diesel particulate honeycomb filter comprising a frontal inlet end, an outlet end, a group of cell channels extending from the frontal inlet end to the outlet end which are end-plugged in a checkered pattern either at the frontal inlet end or at the outlet end, and another group of partial cell channels, wherein the partial cell channels extend partially from the frontal inlet end into the honeycomb filter body, wherein the partial cell channels are unplugged at the frontal inlet end.

17. The ceramic filter of claim 1 further having an open frontal section area of less than 50% of an open frontal area of a frontal inlet end having only checkered plugging.

18. The ceramic filter of claim 17 wherein the open frontal area is less than 25%.

19. The ceramic filter of claim 18 wherein the open frontal area is less than 15%.

20. A ceramic filter for trapping and combusting diesel exhaust particulates comprising a honeycomb filter body composed of porous ceramic material and including a plurality of parallel cell channels traversing the body from a frontal inlet end to an outlet end thereof, wherein:

a portion of the cell channels are end-plugged in a non-checkered pattern, and the remaining cell channels are end-plugged in a checkered pattern, and, the frontal inlet end comprises a first section of non-checkered end-plugged cells, and a second section of checkered end-plugged cells, and the outlet end comprises cell channels end-plugged in a checkered pattern, and, the first section forms a pattern of four equal circular patterns across the frontal inlet end.

21. The ceramic filter of claim 20 wherein all the cells of the four circular pattern are end-plugged.

22. The ceramic filter of claim 21 wherein the first section forms a pattern of four contiguous rings.

23. The ceramic filter of claim 22 wherein all the cells of the four contiguous rings are end-plugged.

24. A ceramic filter for trapping and combusting diesel exhaust particulates comprising a honeycomb filter body composed of porous ceramic material and including a plurality of parallel cell channels traversing the body from a frontal inlet end to an outlet end thereof, wherein:

a portion of the cell channels are end-plugged in a checkered pattern at the frontal inlet end, and, another portion of partial cell channels, the partial cell channels extending partially from the frontal inlet end into the honeycomb filter body, the partial cell channels being unplugged at the frontal inlet end.

* * * * *